A. COHN.
BAKING PAN.
APPLICATION FILED AUG. 28, 1912.
1,084,790.
Patented Jan. 20, 1914.
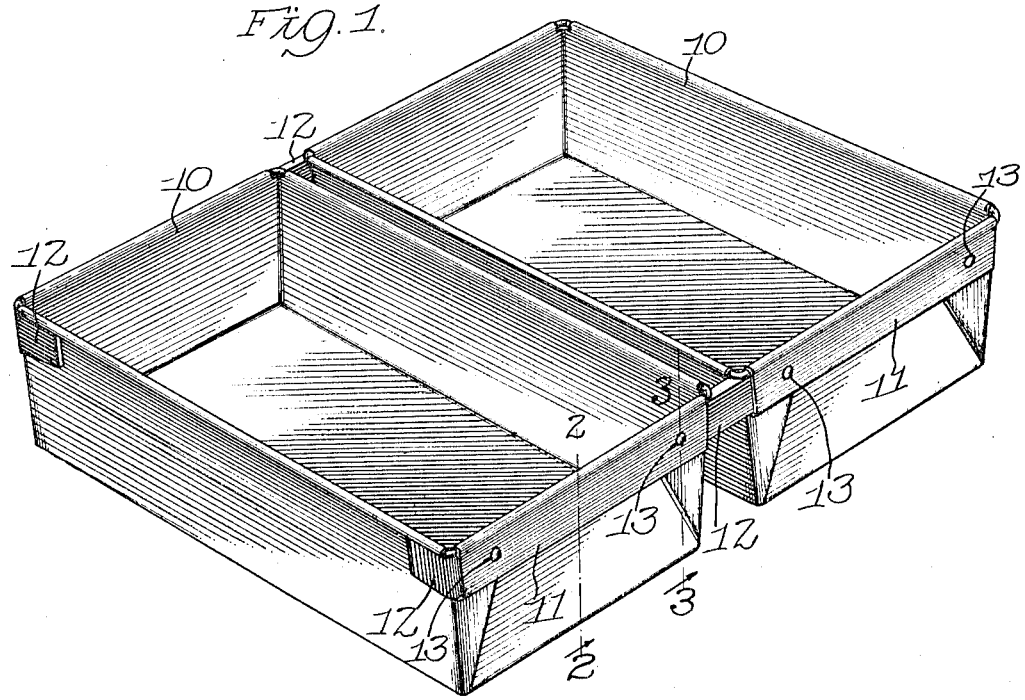
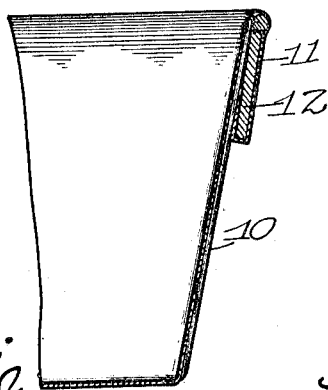
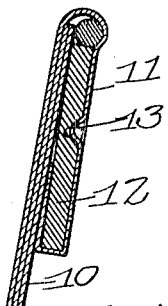
Witnesses:
Inventor:
Albert Cohn
By Brown & Hopkins
Attys.

UNITED STATES PATENT OFFICE.

ALBERT COHN, OF CHICAGO, ILLINOIS, ASSIGNOR TO EDWARD KATZINGER COMPANY, OF CHICAGO, ILLINOIS, A CORPORATION OF ILLINOIS.

BAKING-PAN.

1,084,790.  Specification of Letters Patent.  Patented Jan. 20, 1914.

Application filed August 28, 1912. Serial No. 717,430.

*To all whom it may concern:*

Be it known that I, ALBERT COHN, a citizen of the United States, residing at Chicago, in the county of Cook and State of Illinois, have invented certain new and useful Improvements in Baking-Pans, of which the following is a specification.

My invention relates to baking pans and has for its primary object the provision of improved baking pans comprising a plurality of individual pans joined together.

Further objects of my invention will appear in the following description and will be more specifically set forth in the appended claims.

In the accompanying drawings, which are made a part of this specification and show the preferred embodiment of my invention, Figure 1 shows two bread pans made in accordance with the principles of my invention. Fig. 2 is a slightly enlarged section taken on the line 2—2 of Fig. 1. Fig. 3 is an enlarged section taken on the line 3—3 of Fig. 1.

Reference numeral 10 indicates any ordinary form of baking pan; 11 is a flap integral with 10 and formed on each of its ends; 12 is a strap preferably of sheet metal; 13 is an indentation in the strap 12.

In the process of baking it is desirable to have a plurality of baking pans joined together side by side with their respective ends in register and spaced slightly apart that the heated air of the oven may pass between them and communicate its heat evenly to the sides as well as the ends of the loaves. Formerly this joining has been accomplished by means of straps similar to those indicated by numeral 12 in the drawings and with rivets passing from the interior of the pan outwardly through the straps. A disadvantage of this method of joining the pans together is that it breaks the continuity of the interior of the pan, makes unsightly marks upon the loaves baked therein and forms small pockets or apertures where foreign matter readily finds lodgment. To overcome this disadvantage I provide each end of the pans with the flap 11 adapted to fold around the strap 12 which is placed on the outside and across the ends of the pans and adjacent the upper edge of the end of the pans; in the strap 12 I provide the indentations 13 into which portions of the flap 12 are forced, the flap and the strap being in closest possible contact; though the flap 11 may be made to register with the indentation 13 by first making the indentation and then forcing a portion of the flap into the indentation I prefer to form the indentation 13 by pressure upon the flap 11 after it has been folded about the strap. I prefer to extend the strap slightly beyond the outer side of the end pans and bend the extensions thereof around the corners of the end pans where it may be fastened into position by welding or any other convenient means. It will readily be seen that the close engagement of the flap 11 with the strap 12 and its indentation 13 locks each pan in its position upon the strap 12, leaving the interior of the pan unbroken.

What I claim is:

1. A plurality of baking pans having unbroken interiors, disposed side by side, and spaced apart a distance sufficient to admit the free vertical passage of heated air between them, a reinforcing wire secured about the upper edge of each pan, flat straps across the ends of the pans and in contact with the reinforcing wires, and flaps upon the ends of the pans infolding the wires and straps and binding the pans and straps together.

2. A plurality of baking pans having unbroken interiors, disposed side by side, and spaced apart a distance sufficient to admit the free vertical passage of heated air between them, a reinforcing wire secured about the upper edge of each pan, indented flat straps across the ends of the pans and in contact with the reinforcing wires, and flaps upon the ends of the pans infolding the wires and straps, in close engagement with the strap indentations, and binding the pans, straps and wires together.

In testimony whereof I have signed my name to this specification, in the presence of two subscribing witnesses, on this 26th day of August A. D. 1912.

ALBERT COHN.

Witnesses:
ARTHUR L. SPRINKLE,
HAROLD G. ROCKWELL.